(12) United States Patent
Hwang et al.

(10) Patent No.: US 11,364,778 B2
(45) Date of Patent: Jun. 21, 2022

(54) IMPACT BEAM

(71) Applicant: LOTTE CHEMICAL CORPORATION, Seoul (KR)

(72) Inventors: Yeun Hee Hwang, Daejeon (KR); Min Su Song, Daejeon (KR); Kyo Min Lee, Daejeon (KR)

(73) Assignee: Lotte Chemical Corporation, Seoul (KR)

( * ) Notice: Subject to any disclaimer, the term of this patent is extended or adjusted under 35 U.S.C. 154(b) by 47 days.

(21) Appl. No.: 16/885,496

(22) Filed: May 28, 2020

(65) Prior Publication Data

US 2021/0008965 A1 Jan. 14, 2021

Related U.S. Application Data

(63) Continuation-in-part of application No. PCT/KR2018/015068, filed on Nov. 30, 2018.

(30) Foreign Application Priority Data

Nov. 30, 2017 (KR) .................. 10-2017-0163528

(51) Int. Cl.
*B60J 5/04* (2006.01)

(52) U.S. Cl.
CPC .......... *B60J 5/0444* (2013.01); *B60J 5/0481* (2013.01)

(58) Field of Classification Search
CPC ............................ B60J 5/0444; B60J 5/0481
USPC ...................................... 296/146.6
See application file for complete search history.

(56) References Cited

U.S. PATENT DOCUMENTS

| 5,672,405 | A | 9/1997 | Plank, Jr. et al. |
| 7,111,882 | B2* | 9/2006 | Corscadden ............ B29C 70/46 |
| | | | 293/120 |
| 8,220,850 | B2 | 7/2012 | Opperman et al. |
| 2006/0112560 | A1 | 6/2006 | Van Damme et al. |
| 2009/0091061 | A1 | 4/2009 | Opperman et al. |
| 2014/0217757 | A1* | 8/2014 | Lokere ................ D03D 15/593 |
| | | | 293/120 |
| 2015/0129116 | A1* | 5/2015 | Richeton ................ B60R 19/12 |
| | | | 156/180 |

FOREIGN PATENT DOCUMENTS

| JP | 11-173356 | A | | 6/1999 |
| JP | 4592767 | B2 | | 12/2010 |
| JP | 4595713 | B2 | | 12/2010 |
| JP | 4972684 | B2 | | 7/2012 |
| KR | 10-2015-0060147 | A | | 6/2015 |
| KR | 10-2017-0038395 | A | | 4/2017 |
| KR | 20170038395 | A | * | 4/2017 |
| WO | 2019/108007 | A1 | | 6/2019 |

OTHER PUBLICATIONS

International Search Report in counterpart International Application No. PCT/KR2018/015068 dated Mar. 20, 2019, pp. 1-4.

* cited by examiner

*Primary Examiner* — Jason S Morrow
*Assistant Examiner* — Wenwei Zhou
(74) *Attorney, Agent, or Firm* — Additon, Pendleton & Witherspoon, P.A.

(57) ABSTRACT

The present invention relates to an impact beam having a structure in which a plurality of peak portions and a plurality of valley portions are repeatedly and alternately disposed, and including a reinforcement fiber that is continuously coupled to at least one of the plurality of peak portions and the plurality of valley portions along a length direction.

8 Claims, 4 Drawing Sheets

IMPACT BEAM

CROSS-REFERENCE TO RELATED APPLICATIONS

This application claims priority to and the benefit of Korean Patent Application No. 10-2017-0163528 filed in the Korean Intellectual Property Office on Nov. 30, 2017, the entire contents of which are incorporated herein by reference.

This application also claims priority to and the benefit of International Application No. PCT/KR2018/015068, filed Nov. 30, 2018, the entire contents of which are also incorporated herein by reference.

TECHNICAL FIELD

The present invention relates to an impact beam. More particularly, the present invention relates to an impact beam that is mounted in e.g., a door of a vehicle to absorb an impact when the vehicle crashes, and to protect a driver and a passenger.

BACKGROUND OF THE INVENTION

As part of countermeasures against environmental problems, each country has implemented a carbon emission regulation policy, and accordingly various studies are being conducted to reduce carbon emissions of vehicles.

One method for reducing the carbon emissions of the vehicles is to reduce a weight of the vehicle. The technologies related to weight reduction of the vehicle include a hot stamping technology for manufacturing ultra-high-strength steel that improves strength and stiffness compared to conventional steels, and can be lightweight, a hybrid material technology that uses a carbon fiber that is a lightweight material or a steel and a synthetic resin together, and so on.

The ultra-high-strength steel manufactured by the hot stamping technology has a problem of low energy absorption at impact due to an increase in excessive carbon contents during the manufacturing process. The carbon fiber has high cost compared to functionality. In addition, the hybrid material technology has a problem of a low weight reduction effect compared to conventional steel components.

CONTENTS OF THE INVENTION

Object to be Achieved

One aspect of the present invention is to provide an impact beam in which stability against external impact is secured while being lighter than a conventional steel impact beam.

The tasks of the present invention are not limited to the above-mentioned tasks, and other tasks which are not mentioned will be clearly understood by a person of an ordinary skill in the art from the following description.

Means for Achieving the Object

To achieve such purposes, an impact beam according to an exemplary embodiment of the present invention may have a plurality of peak portions and a plurality of valley portions alternately disposed and include a reinforcement fiber disposed in at least one of the a plurality of peak portions and the plurality of valley portions in a length direction.

The reinforcement fiber may include a unidirectional continuous fiber.

In further detail, the impact beam may include the plurality of peak portions extending along the length direction, the plurality of valley portions extending along the length direction, the plurality of wall portions, each connecting the peak portion and the valley portion adjacent to each other, and the reinforcement fiber disposed in at least one of the a plurality of peak portions and the plurality of valley portions in the length direction.

The plurality of peak portions, the plurality of valley portions, and the plurality of wall portions may be integrally formed with each other by using a glass fiber reinforced thermoplastic resin.

The plurality of peak portions and the plurality of valley portions may be mounted in a door of a vehicle, and the plurality of peak portions may be mounted exterior to the plurality of valley portions.

According to another exemplary embodiment of the present invention, the door of the vehicle in which the impact beam is mounted may be provided.

Other specifics of the present invention are included in the detailed description and drawings.

Effect of the Invention

According to exemplary embodiments of the present invention, at least the following effects are obtained.

It is possible to reduce a weight compared to conventional steel impact beams, while minimizing bending deformation against external impact.

The effects according to the present invention are not limited by the contents exemplified above, and more various effects are included in this specification.

DETAILS FOR EXECUTING THE INVENTION

Figure 1:
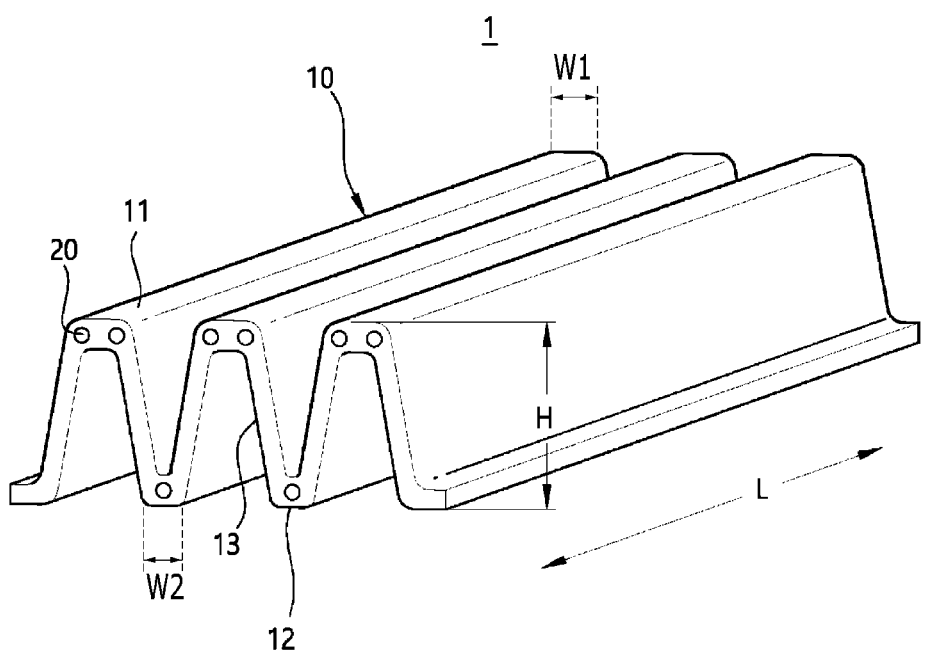
FIG. 1 is a perspective view of an impact beam according to the first exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

FIG. 1 is a perspective view of an impact beam according to the first exemplary embodiment of the present invention.

As described above, the impact beam according to the first exemplary embodiment of the invention has a structure in which a plurality of peak portions and a plurality of valley portions are repeatedly and alternately disposed, and includes a reinforcement fiber that is continuously coupled to at least one of the plurality of peak portions and the plurality of valley portions along a length direction.

As shown in FIG. 1, the impact beam 1 according to the first exemplary embodiment of the present invention includes a body 10 and a reinforcement fiber 20.

The body 10 can be formed as an integral structure using a synthetic resin.

The body 10 includes at least one peak portion 11, at least one valley portion 12, and at least one wall portion 13.

The at least one peak portion 11 extends along a length direction L. One valley portion 12 is formed between the neighboring peak portions 11. The at least one valley portion 12 also extends along the length direction L. A width w1 of each peak portion 11 may be constant, a width w2 of each valley portion 12 may be constant, and the width w1 of each peak portion 11 may be wider than the width w2 of each valley portion 12.

The peak portions 11 may be positioned on the same plane, and the valley portions 12 may also be positioned on the same plane. The valley portions 12 and the peak portions 11 are positioned on different planes. In this case, a distance between the valley portion 12 and the peak portion 11 is a height H of the impact beam 1.

At least one wall portion 13 is formed to connect the peak portion 11 and the valley portion 12 adjacent to each other.

Figure 4:
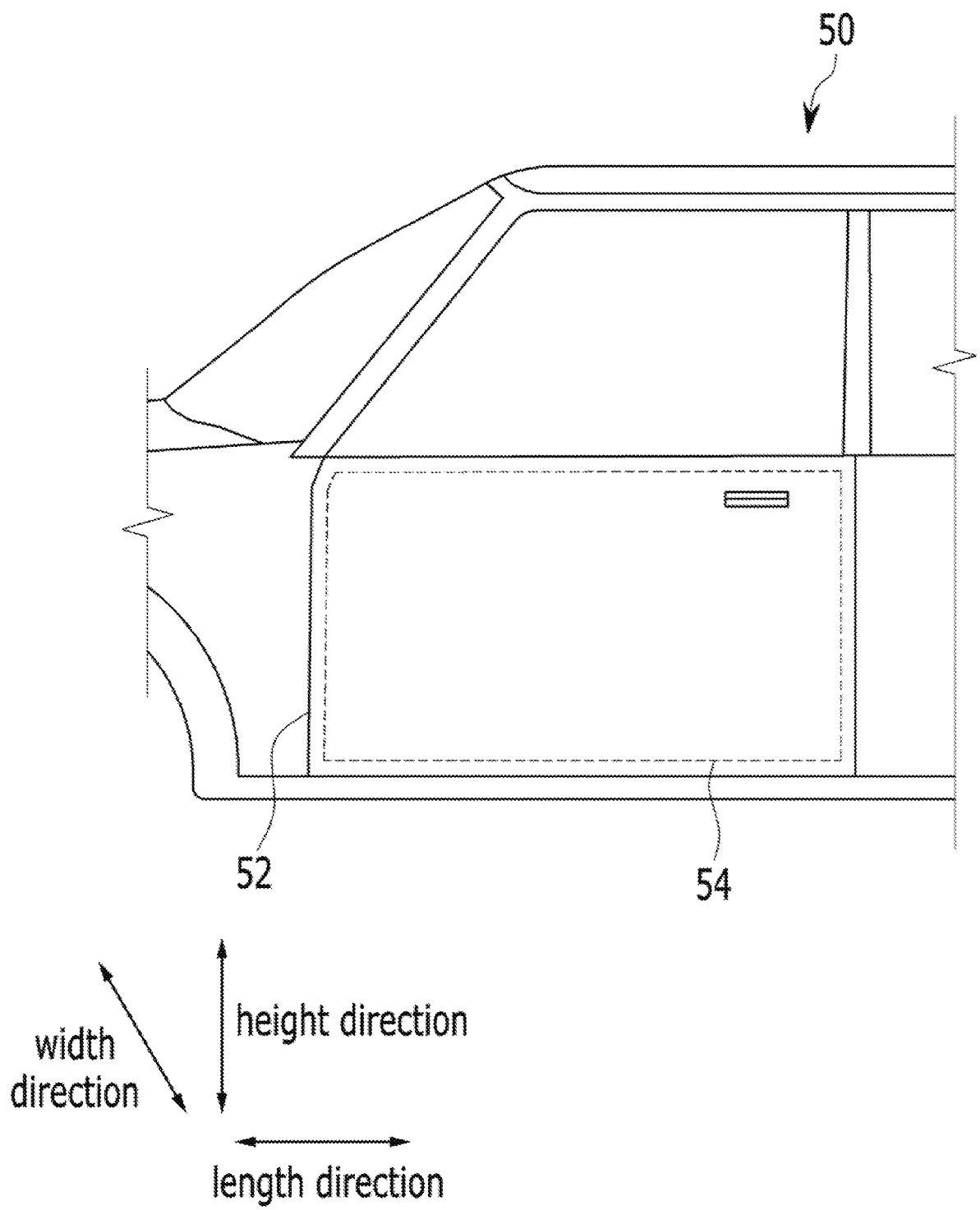
FIG. 4 illustrates a part of vehicle into which an impact beam according to any one of the exemplary embodiments of the present invention can be mounted.

The impact beam 1 according to the first exemplary embodiment of the present invention, as shown in FIG. 4, may be mounted inside a door 52 of a vehicle 50. A dotted box in FIG. 4 exemplifies a mounting portion 54. However, the mounting portion 54 of the impact beam 1 is not limited to that exemplified in FIG. 4. The impact beam 1 is installed such that a height H direction of the impact beam 1 is approximately parallel to a width direction (i.e., left and right direction) of the vehicle 50 and the peak portion 11 can be mounted exterior to the valley portion 12.

In addition, the length L direction of the impact beam 1 according to the first exemplary embodiment of the present invention may be approximately parallel to a length direction (i.e., front and rear direction) of the vehicle 50, or approximately parallel to a height direction (i.e., top and bottom direction) of the vehicle 50.

Meanwhile, as shown in FIG. 1, the reinforcement fibers 20 are coupled to the peak portions 11 and the valley portions 12, respectively. The reinforcement fibers 20 may be mounted inside the peak portions 11 and the valley portions 12. In addition, the number of the reinforcement fibers 20 in each peak portion 11 may be greater than the number of the reinforcement fibers 20 in each valley portion 12. In addition, the reinforcement fibers 20 may not be disposed inside the wall portions.

A unidirectional continuous fiber can be used as the reinforcement fiber 20, and the reinforcement fiber 20 may continuously exist along the length direction of the impact beam.

To strengthen bond between the reinforcement fiber 20 and the body 10 and to prevent separation between the reinforcement fiber 20 and the body 10, the body 10 may be formed of a glass fiber reinforced thermoplastic resin (glass fiber reinforced nylon resin).

The impact beam 1 according to the first exemplary embodiment of the present invention is manufactured by insert-molding the body 10 after the reinforcement fiber 20 is seated in a mold, so that the reinforcement fiber 20 and the body 10 can be integrally formed with each other.

Since the impact beam 1 according to the first exemplary embodiment of the present invention has a continuously crooked structure in which the plurality of peak portions 11 and the plurality of valley portions 12 are alternately and repeatedly formed, a portion of the impact transmitted to the impact beam 1 during a side collision of the vehicle 50 can be absorbed while it is possible to minimize the bending deformation of the impact beam 1.

In addition, since the body 10 is made of the synthetic resin, it is possible to reduce a weight of the impact beam 1 by about 15% or more, compared to an impact beam using steel as a main material. Since the reinforcement fibers 20 are coupled respectively with the peak portions 11 and the valley portions 12, it is possible to minimize the bending deformation of the impact beam 1 due to the impact transmitted during the side collision of the vehicle 50.

Hereinafter, an impact beam according to another exemplary embodiment will be described. For better comprehension and ease of description, the components similar to those according to the first exemplary embodiment are designated by the same reference numerals, and the description common to the first exemplary embodiment are omitted.

Figure 2:
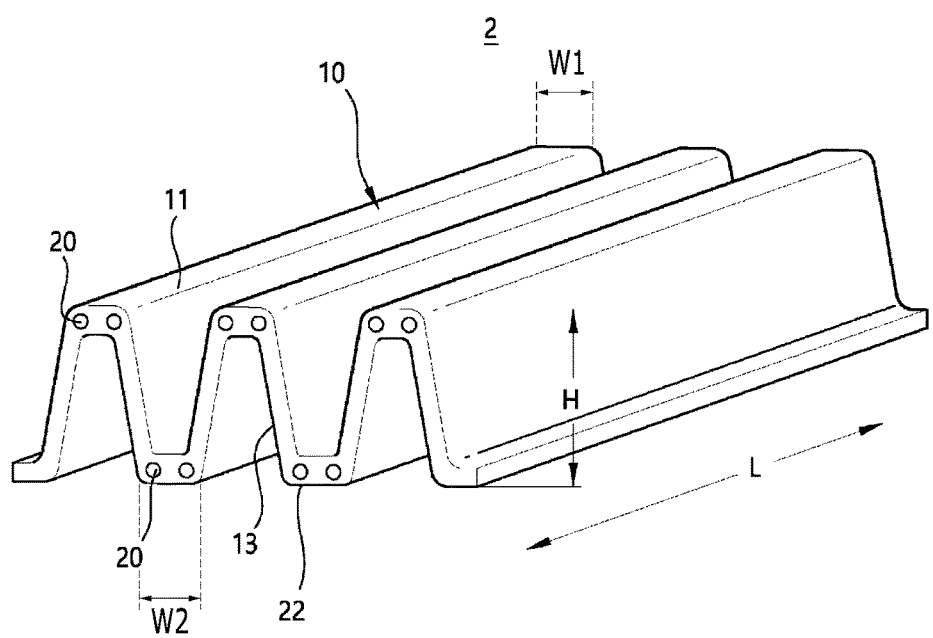
FIG. 2 is a perspective view of an impact beam according to the second exemplary embodiment of the present invention.

FIG. 2 is a perspective view of an impact beam according to the second exemplary embodiment of the present invention.

The impact beam 2 according to the second exemplary embodiment of the present invention includes the reinforcement fibers 20 in the valley portions 22, and the number of the reinforcement fibers 20 is increased, compared to the impact beam 1 according to the first exemplary embodiment described above.

To this end, the valley portion 22 according to the present exemplary embodiment may be formed to have a wider width than the valley portion 12 of the impact beam 1 according to the first exemplary embodiment described above. For example, the width w1 of each peak portion 11 and the width w2 of each valley portion 12 are almost the same as each other, and the number of the reinforcement fibers 20 in each peak portion 11 may be the same as the number of the reinforcement fibers 20 in each valley portion 22.

In order to be compared with the impact beam 1 according to the first exemplary embodiment shown in FIG. 1, it is illustrated in FIG. 2 that the impact beam 2 includes the valley portion 22 in which two reinforcement fibers 20 are included therein. However, if necessary, the number of the reinforcement fibers 20 included in each valley portion 22 can be two or more.

Since the impact beam 2 according to the present exemplary embodiment additionally includes the reinforcement fibers 20 in the valley portions 22, compared with the impact beam 1 according to the first exemplary embodiment which is described above, the bending deformation of the impact beam 2 by the impact transmitted during the side collision of the vehicle 50 can be further minimized.

Figure 3:
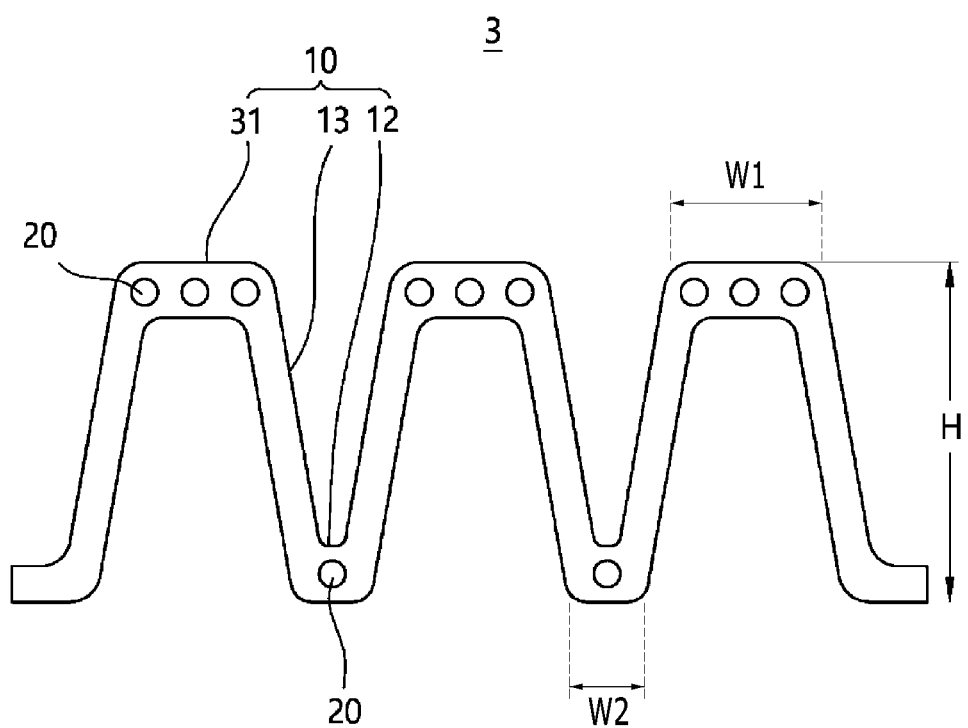
FIG. 3 is a front view of an impact beam according to the third exemplary embodiment of the present invention.

FIG. 3 is a front view of an impact beam according to the third exemplary embodiment of the present invention.

As shown in FIG. 3, the impact beam 3 according to the third exemplary embodiment of the present invention includes the reinforcement fibers 20 in the peak portions 31, and the number of the reinforcement fibers 20 is increased, compared to the impact beam 1 according to the first exemplary embodiment described above.

To this end, the peak portion 31 according to the present exemplary embodiment may be formed to have a wider width than the peak portion 31 of impact beam 1 according to the first exemplary embodiment described above. For example, the width w1 of each peak portion 31 is wider than the width w2 of each valley portion 12, and the number of the reinforcement fibers 20 in each peak portion 31 may be greater than the number of the reinforcement fibers 20 in each valley portion 12.

In order to be compared with the impact beam 1 according to the first exemplary embodiment shown in FIG. 1, it is illustrated in FIG. 3 that the impact beam 2 includes the peak portion 31 in which three reinforcement fibers 20 are included therein. However, if necessary, the number of the reinforcement fibers 20 included in each peak portion 31 can be three or more.

Since the impact beam 3 according to the present exemplary embodiment additionally includes the reinforcement fibers 20 in the peak portions 31, compared with the impact beam 1 according to the first exemplary embodiment which is described above, the bending deformation of the impact beam 3 by the impact transmitted during the side collision of the vehicle 50 can be further minimized.

On the other hand, in this specification, as other exemplary embodiment, the door 52 of the vehicle 50 in which the above-described impact beam 10 is mounted is provided.

Those of ordinary skill in the art to which the present invention belongs may understand that the present invention can be implemented in other specific forms without changing the technical idea or essential features. While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

DESCRIPTION OF SYMBOLS 1, 2, 3: impact beam
10: body
11, 31: peak portion
12, 22: valley portion
13: wall portion
20: reinforcement fiber
H: height direction
L: length direction

The invention claimed is:

1. An impact beam having a plurality of peak portions and a plurality of valley portions alternately disposed, the impact beam comprising:
   the plurality of peak portions extending along the length direction;
   the plurality of valley portions extending along the length direction; and
   a plurality of wall portions, each connecting the peak portion and the valley portion adjacent to each other,
   a reinforcement fiber disposed in at least one of the plurality of peak portions and the plurality of valley portions in a length direction,
   wherein the plurality of peak portions, the plurality of valley portions, and the plurality of wall portions are integrally formed with each other by using a thermoplastic resin, and
   wherein a plurality of reinforcement fibers is respectively disposed inside the plurality of peak portions and the plurality of valley portions and is not disposed in any of the plurality of wall portions.

2. The impact beam of claim 1, wherein the reinforcement fiber includes a unidirectional continuous fiber.

3. The impact beam of claim 1, wherein the plurality of peak portions and the plurality of valley portions are mounted in a door of a vehicle, and
   wherein the plurality of peak portions are mounted exterior to the plurality of valley portions.

4. The impact beam of claim 1, wherein a width of each peak portion is constant, a width of each valley portion is constant, and the width of each peak portion is wider than the width of each valley portion.

5. The impact beam of claim 4, wherein the number of the reinforcement fibers in each peak portion is greater than the number of the reinforcement fibers in each valley portion.

6. The impact beam of claim 1, wherein a width of each peak portion is constant, a width of each valley portion is constant, and the width of each peak portion is the same as the width of each valley portion.

7. The impact beam of claim 4, wherein the number of the reinforcement fibers in each peak portion is the same as the number of the reinforcement fibers in each valley portion.

8. A door of a vehicle in which the impact beam of claim 1 is mounted.

* * * * *